United States Patent
Cheng et al.

(10) Patent No.: US 9,054,396 B2
(45) Date of Patent: Jun. 9, 2015

(54) METHOD FOR CHARGING A LITHIUM ION BATTERY BY INCREASING A CHARGE LIMIT VOLTAGE TO COMPENSATE FOR INTERNAL BATTERY VOLTAGE DROP

(75) Inventors: Dingbo Cheng, Guangzhou (CN); Shengcheng Tang, Guangzhou (CN); Shihua Zeng, Guangzhou (CN)

(73) Assignee: GUANGZHOU FULLRIVER BATTERY NEW TECHNOLOGY CO., LTD, Guangdong (CN)

( * ) Notice: Subject to any disclaimer, the term of this patent is extended or adjusted under 35 U.S.C. 154(b) by 699 days.

(21) Appl. No.: 13/059,918

(22) PCT Filed: Jul. 2, 2009

(86) PCT No.: PCT/CN2009/000747
§ 371 (c)(1),
(2), (4) Date: Feb. 18, 2011

(87) PCT Pub. No.: WO2010/034179
PCT Pub. Date: Apr. 1, 2010

(65) Prior Publication Data
US 2011/0156660 A1    Jun. 30, 2011

(30) Foreign Application Priority Data
Sep. 28, 2008    (CN) ........................ 2008 1 0198973

(51) Int. Cl.
H02J 7/04    (2006.01)
H01M 10/44    (2006.01)
H02J 7/00    (2006.01)

(52) U.S. Cl.
CPC ............... *H01M 10/44* (2013.01); *H02J 7/045* (2013.01); *H02J 7/008* (2013.01); *H02J 7/0077* (2013.01)

(58) Field of Classification Search
CPC ....... H01M 10/44; H02J 7/008; H02J 7/0077; H02J 7/045
USPC .................................................. 320/157, 162
See application file for complete search history.

(56) References Cited

U.S. PATENT DOCUMENTS

| | | | | |
|---|---|---|---|---|
| 5,408,170 A * | 4/1995 | Umetsu et al. | ................. | 320/148 |
| 5,596,259 A * | 1/1997 | Mino et al. | ................. | 320/157 |
| 5,861,733 A * | 1/1999 | Yoshikawa | ................. | 320/143 |
| 5,900,718 A * | 5/1999 | Tsenter | ................. | 320/151 |
| 6,040,684 A * | 3/2000 | Mitchell | ................. | 320/139 |
| 6,040,685 A * | 3/2000 | Tsenter et al. | ................. | 320/160 |
| 6,043,631 A * | 3/2000 | Tsenter | ................. | 320/148 |
| 6,222,345 B1 * | 4/2001 | Yamanashi | ................. | 320/132 |
| 2003/0112011 A1 * | 6/2003 | Guiheen et al. | ................. | 324/429 |
| 2005/0035743 A1 * | 2/2005 | Kawakami et al. | ................. | 320/162 |
| 2008/0122399 A1 * | 5/2008 | Nishino et al. | ................. | 320/103 |
| 2009/0001935 A1 * | 1/2009 | Odaohhara | ................. | 320/134 |
| 2010/0156356 A1 * | 6/2010 | Asakura et al. | ................. | 320/148 |

FOREIGN PATENT DOCUMENTS

| | | |
|---|---|---|
| CN | 1556417 A | 12/2004 |
| CN | 1845418 A | 10/2006 |
| CN | 101110519 A | 1/2008 |
| JP | 5-343101 A | 12/1993 |
| JP | 6-325794 A | 11/2004 |

OTHER PUBLICATIONS

International Search Report, PCT/CN2009/000747 dated Sep. 22, 2009.

* cited by examiner

*Primary Examiner* — Yalkew Fantu
*Assistant Examiner* — Manuel Hernandez
(74) *Attorney, Agent, or Firm* — Locke Lord LLP; Howard M. Gitten

(57) ABSTRACT

The present invention provides a quick charge method belonging to the field of the battery and particularly relates to a quick charge method for lithium ion battery and polymer lithium ion battery. During a battery is being charged, the battery stops charging when the battery is charged to a charge limit voltage, and the charge limit voltage between two poles of the battery is set to be $U=2U_0-U_s$, and $U_s$ is a stabilized voltage which the voltage of the battery falls back to after the voltage of the battery is charged to $U_0$ at a constant current, $U_0$ is a standard charge cutoff voltage used by a low rate constant current-constant voltage charging mode which is normally accepted by the industries, and the stabilized voltage $U_s$ is selected as follows: timing begins when the battery stops charging at the constant current, and from a certain time segment, when the drop of an open-circuit voltage of the battery is less than a certain value within the certain time segment, which means that the voltage of the battery is stable, and a voltage corresponding to the first time point of this time segment is selected as the stabilized voltage $U_s$ of the battery.

4 Claims, No Drawings

METHOD FOR CHARGING A LITHIUM ION BATTERY BY INCREASING A CHARGE LIMIT VOLTAGE TO COMPENSATE FOR INTERNAL BATTERY VOLTAGE DROP

CROSS REFERENCES TO RELATED APPLICATIONS

This application is a U.S. national phase application pursuant to 35 U.S.C. §371, of PCT/CN2009/000747 filed on Jul. 2, 2009, which claims priority to Chinese Patent Application No. 200810198973.5 filed on Sep. 28, 2008. The entire contents of the aforementioned patent applications are incorporated herein by these references

FIELD OF THE INVENTION

The present invention relates to a quick charge method belonging to the field of the battery, and particularly relates to a quick charge method for lithium ion battery and polymer lithium ion battery.

BACKGROUND OF THE INVENTION

With the rapid development of mobile electrical equipments, the demand on the quick charge performance for the secondary lithium ion battery becomes higher and higher, and it is desirable to find a manner to complete charging the battery in the shortest time. Currently, a charge mode of constant current-constant voltage is customarily adopted, which takes a long time to remain the constant voltage in charge process, thereby the purpose of the quick charge is hardly achieved. The purpose of quick charge can be achieved by increasing the limit voltage when charging the battery in constant current, but side effects may occur inside the battery if the limit voltage of the battery is a little higher; the battery is hardly fully charged if the limit voltage is a little lower. CN100392943C discloses a quick charge method, which compensates for the charge voltage of the battery by employing a method of impedance voltage drop compensation, and the charge cut-off voltage of the battery is set to be $V_x = V + IR_\Omega + IR_\Omega$, wherein $R_\Omega$ is an ohmic internal resistance of the battery. However, for the battery, except that the resistance of the ohmic internal resistance can be directly measured, it is difficult to measure the resistances of the concentration polarization impedance, the electrochemical polarization impedance and all other unknown impedances in a direct way.

SUMMARY OF THE INVENTION

The object of the present invention is to avoid the disadvantages of the prior art to provide a simple and convenient quick charge method for battery, increase the charge limit voltage of the battery to compensate for the voltage drop generated by various impedances in the charge process of the battery so as to achieve the quick charge, and use relationships between different charge speeds and cycle performances of the battery to find a quick charge strategy which satisfies requirement of a certain cycle performance.

The object of the quick charge of this invention is achieved by the following measures. In this invention, an operation of charge-abeyance is performed on the battery, the voltage drop $\Delta V$ of the battery generated by the presence of an ohmic resistance, a concentration polarization impedance, an electrochemical polarization impedance and all other unknown impedances under said charge strategy is rapidly and accurately found, and the charge limit voltage of the battery is increased to compensate for the voltage drop generated by various impedances in the charge process of the battery.

For the lithium ion battery, the stable open-circuit voltage of the battery after the battery is charged is proportional to the capacity charged into the battery. In the process of charging the battery, the charge is stopped when the voltage reaches the charge limit voltage, and the open-circuit voltage of the battery starts to fall back and gradually becomes stable. This phenomenon occurs, because when the current flows through the battery, the ohmic resistance, concentration polarization impedance, electrochemical polarization impedance and all other unknown impedances inside the battery will consume a part of the voltage $\Delta V$. In the quick charge process of the battery, instead of various impedances generated in the battery charge process or the value of each certain impedance, what we actually need to be concerned about is the effect on the battery voltage generated by combined action of various impedances, that is, to find a voltage fallback value $\Delta V$ after the charge of the battery is stopped under a certain charge strategy, so as to compensate for the charge cutoff voltage of the battery when the battery is being charged. For the same battery, different charge currents I correspond to different $\Delta V$, and if the rate is higher when charging, the current I is higher, and the $\Delta V$ after charging is higher.

A quick charge method, wherein in the process of charging a battery, the battery stops charging when the charge voltage reaches the charge limit voltage, and the charge limit voltage between two poles of the battery is set to be $U = 2U_0 - U_s$, $U_s$ is the stabilized voltage which the voltage of the battery falls back to after it is charged to $U_0$ at a constant current, and $U_0$ is a standard charge cutoff voltage used by a low rate constant current-constant voltage charging mode which is generally accepted by the industries.

The timing of the selection of the stabilized voltage $U_s$ begins when the battery stops charging at the constant current and begins to be in abeyance. From a certain time segment, when the drop of an open-circuit voltage of the battery is less than a certain value within the certain time segment, which means that the voltage of the battery is stable, a voltage corresponding to the first time point of this time segment is selected as the stabilized voltage $U_s$ of the battery.

A way of charging a battery only at a constant current is adopted. The charge current is selected based on the required speed of charging, for instance, if it is required to fully charge the battery within time t, the theoretical charge current of the battery is as follows:

$$I = \frac{C_r}{t} \times 60 \qquad \text{formula (1)}$$

In formula (1): I represents the required current for charging the battery; $C_r$ represents the rated capacity of the battery; t represents the expected time (min) of fully charging the battery.

Based on formula (1), the charge is stopped when the battery is charged to $U_0$ at a constant current whose value is I, wherein the $U_0$ is the standard charge cutoff voltage used by a low rate constant current-constant voltage charging mode which is generally accepted by the industries, and it depends on the anode and cathode materials used by the lithium ion battery and combination modes of the battery, for instance, the standard charge cutoff voltage of a single cell based on $LiCoO_2/C$ is 4.2V, while the standard charge cutoff voltage of a single cell based on $LiFePO_4/C$ is 3.6V. The battery is in abeyance, the value $U_s$ of the stabilized voltage is recorded when open-circuit voltage of the battery is stable, then the fallback value of the voltage after the charge of the lithium ion battery at a constant current whose value is I is stopped is $\Delta V=U_0-U_s$. In order to make sure that the battery is fully charged within time t, the battery is charged at a constant current whose value is I, and meanwhile, the charge limit voltage is set to be $U=U_0+\Delta V=2U_0-U_s$. The following mode may be employed for selecting the stabilized voltage $U_s$: timing begins when the battery stops charging at the constant current and begins to be in abeyance, and from a certain time segment, when the drop of the open-circuit voltage of the battery is less than a certain value in the certain time segment, which means that the voltage of the battery is stable, a voltage corresponding to the first time point of this time segment is selected as the stabilized voltage $U_s$ of the battery.

In this invention, the timing may begin from the time that the battery stops charging at the constant current and begins to be in abeyance, and every 5 minutes serves as one time segment. When starting from a certain time segment, the drop of the open-circuit voltage of the battery within the time segment of 5 minutes is less than 2 mV, which means that the voltage of the battery is stable, and the voltage corresponding to the first time point of this time segment is selected as the stabilized voltage $U_s$ of the battery.

In this invention, the timing may begin from the time that the battery stops charging at the constant current and begins to be in abeyance, and every 10 minutes serves as one time segment. When starting from a certain time segment, the drop of the open-circuit voltage of the battery within the time segment of 10 minutes is less than 1 mV, which means that the voltage of the battery is stable, and the voltage corresponding to the first time point of this time segment is selected as the stabilized voltage $U_s$ of the battery.

The method of stopping charging when the battery is charged to $U=U_0+\Delta V=2U_0-U_s$ at the constant current is employed, since there are no processes of charging at a constant voltage, the charge speed is increased. In order to put said method into practice, optimizations of the cycle life and safety performance are required.

The optimization of the cycle life: in this invention, the purpose of realizing quick charge in the case that the cycle performance is ensured is achieved by the following measures. The charge time can be shortened if the charge current is increased, however, the $U_s$ is reduced at the same time, thereby the charge cutoff voltage is a little higher. If the charge limit voltage of the battery is a little higher, side effects occurring in the process of the charge may affect the cycle life of the battery. The substantive influence factor in deciding whether or not the lithium ion battery can be rapidly charged lies in the materials used by said lithium ion battery and the design of the battery, and the charge method simply enables the charge speed to reach the highest charge speed of the battery as much as possible. Thus, in the practical use of the lithium ion battery, the charge speed and the service life of the battery should be optimized, thereby an optimal charge speed is required to enable more electric quantity to be charged into the battery in a shortest time while ensuring that the battery satisfies a certain requirement of the cycle performance under said charge speed.

Based on the quick charge method of this invention, a series of charge currents $I_i$ are used to charge the lithium ion battery at the constant current, and stops until the standard charge cutoff voltage $U_0$ is reached. A series of $U_{si}$ and $\Delta V_i$ are measured, and the charge is cut off after charging to $U_i=U_0+\Delta V_i=2U_0-U_{si}$ at the constant current L. Discharge to the standard discharge cutoff voltage based on the practically used discharge current, perform a cycle test and obtain a series of charge speed-cycle performance data, and based on said data, a quickest charge strategy satisfying a certain cycle performance requirement is obtained.

The optimization of the safety performance: the lithium ion battery has different safety performances after the charge-discharge cycle with different charge rates, and generally speaking, the safety performance of a battery undergoing a cycle with a high rate becomes worse. In order to ensure the safety performances of the lithium ion battery in use and at the end of the cycle use, for the battery after different strategy cycles generated from the above optimizing experiments of the cycle life, its safety is tested based on the standard safety testing method or by simulating the practical condition of losing control to select a safe and quick charge method. The super high rate charge method which may cause safety failure after cycle cannot be selected.

The method of the present invention can be used to make a charger.

The method of the present invention can be used to make an electronic component which is assembled with a cell to be used together.

The method of the present invention is simple, effective, practical and easily spread, the charge is quick and more electric quantity can be charged into the battery.

DETAILED DESCRIPTION OF THE INVENTION

This invention is further described by the following embodiments.

Embodiment 1 a polymer lithium ion battery 501417HS10C of a high rate type whose characteristic parameters are 3.7V of the rated voltage and 50 mAh of the rated capacity, the battery system is a single cell ($U_0$=4.2V) based on $LiCoO_2$/C, and it is expected to fully charge the battery respectively within 20 minutes and 15 minutes. Based on the formula-1, the required constant-current charge currents are respectively 150 mA (3C rate) and 200 mA (4C rate).

TABLE 1

| Charge Strategy | $U_s$ (V) | $\Delta V = 4.2 - U_s$ (V) | $U = 4.2 + \Delta V$ (V) |
|---|---|---|---|
| 150 mA constant-current charge, stop at 4.2 V, be in abeyance until a stable voltage of the battery is reached | 4.097 | 0.103 | 4.303 |
| 200 mA constant-current charge, stop at 4.2 V, be in abeyance until a stable voltage of the battery is reached | 4.078 | 0.122 | 4.322 |

TABLE 2

| Charge Mode | Charge Strategy | Expected Charge Time (min) | Actual Charge Time (min) | Discharge Capacity (mAh) When Discharged to 3 V with 1 C discharge rate |
|---|---|---|---|---|
| 1 | Constant-voltage charge after 50 mA constant-current charge | — | 81.3 | 54.6 |

TABLE 2-continued

| Charge Mode | Charge Strategy | Expected Charge Time (min) | Actual Charge Time (min) | Discharge Capacity (mAh) When Discharged to 3 V with 1 C discharge rate |
|---|---|---|---|---|
| | to 4.2 V, stop when current reduced to 2.5 mA | | | |
| 2 | 150 mA constant-current charge, stop at 4.303 V | 20.0 | 21.8 | 53.7 |
| 3 | 200 mA constant-current charge, stop at 4.322 V | 15.0 | 16.2 | 53.2 |

Table 1 represents voltage drops $\Delta V$ generated by the polymer lithium ion battery 501417HS10C of the high rate type under different charge strategies. Table 2 represents the actual charge time and the charged electrical capacity of the battery under different charge strategies, wherein mode 1 is a traditional constant current-constant voltage charge mode, and modes 2 and 3 are the methods of the present invention. Compared with the mode 1, the charge time of the mode 2 and the charge time of the mode 3 are reduced by 73.2% and 80.1% respectively, and the charged capacities take 98.4% and 97.4% of the actual capacity of the battery respectively, thereby the expected purpose of the quick charge is achieved. The data in the table shows that the actual charge time is a little longer than the expected charge time, this is because when using the formula-1 to calculate the charge current, a rated capacity is selected as the battery capacity, but the actual capacity of the battery is a little larger than the rated capacity, thereby the calculated current is a little smaller, and the final result shows that the actual charge time is a little longer. It is the same for Embodiment 2.

Embodiment 2

A polymer lithium ion battery 601417HS10QC of a rapid charge type whose characteristic parameters are 3.7V of the rated voltage and 60 mAh of the rated capacity, the battery system is a single cell ($U_0$=4.2V) based on LiCoO$_2$/C, and it is expected to fully charge the battery respectively within 20 minutes, 12 minutes and 6 minutes. Based on the formula-1, the required constant-current charge currents are 180 mA (3C rate), 300 mA (5C rate) and 600 mA (10C rate) respectively.

TABLE 3

| Charge Strategy | $U_s$ (V) | $\Delta V = 4.2 - U_s$ (V) | $U = 4.2 + \Delta V$ (V) |
|---|---|---|---|
| 180 mA constant-current charge, stop at 4.2 V, be in abeyance until a stable voltage of the battery is reached | 4.103 | 0.097 | 4.297 |
| 300 mA constant-current charge, stop at 4.2 V, be in abeyance until a stable voltage of the battery is reached | 4.058 | 0.142 | 4.342 |
| 600 mA constant-current charge, stop at 4.2 V, be in abeyance until a stable voltage of the battery is reached | 3.955 | 0.245 | 4.445 |

TABLE 4

| Charge Mode | Charge Strategy | Expected Charge Time (min) | Actual Charge Time (min) | Discharge Capacity (mAh) When Discharged to 3.0 V with 1.0 C discharge rate |
|---|---|---|---|---|
| 1 | Constant-voltage charge after 60 mA constant-current charge to 4.2 V, stop when current reduced to 3 mA | — | 66.33 | 60.3 |
| 2 | 180 mA constant-current charge, stop at 4.297 V | 20.0 | 20.53 | 60.7 |
| 3 | 300 mA constant-current charge, stop at 4.342 V | 12.0 | 12.17 | 60.4 |
| 4 | 600 mA constant-current charge, stop at 4.445 V | 6.0 | 6.17 | 60.9 |

Table 3 represents voltage drops $\Delta V$ generated by the polymer lithium ion battery 601417HS10QC of the rapid charge type under different charge strategies. Table 4 represents the actual charge time and the charged electrical capacity of the battery under different charge strategies, wherein mode 1 is a traditional constant current-constant voltage charge mode, and modes 2, 3 and 4 are the quick charge methods of the present invention. Compared with the mode 1, the charge time of the mode 2, the charge time of the mode 3 and the charge time of the mode 4 are reduced by 69.0%, 81.7% and 90.7% respectively; and the charged capacities of the battery reach 100.6%, 100% and 101% respectively, thereby the expected purpose of the quick charge is achieved.

Embodiment 3

A polymer lithium ion battery 501417HS10C of a rapid charge type whose characteristic parameters are 3.7V of the rated voltage and 50 mAh of the rated capacity, the battery system is a single cell ($U_0$=41.2V) based on LiCoO$_2$/C. Suppose there are two clients who have the following requirements to the charge speed and cycle performance of the battery respectively:

Client 1: the battery is required to discharge under a discharge strategy that 1C serves as a discharge current and 3.0V serves as a discharge limit voltage, and the battery can be charged as rapidly as possible under a condition that the battery can maintain more than 80% of the rated capacity even after 250 cycles. It is required that the battery shall not burn or explode even if it undergoes an overcharge of 10C10V in use.

Client 2: the battery is required to discharge under a discharge strategy that 1C serves as a discharge current and 3.0V serves as a discharge limit voltage, and the battery can be charged as rapidly as possible under a condition that the battery can maintain more than 80% of the rated capacity even after 150 cycles. It is required that the battery shall not burn or explode even if it undergoes an overcharge of 10C10V in use.

Based on the above requirements, the expected charge times of the battery are set to be 30 min, 20 min, 15 min, 12 min, 10 min and 6 min respectively. Based on said method of the present invention, constant-current charge currents for different charge times are obtained based on the formula-1, and a quick charge test is performed on the battery by using said quick charge method of the present invention at different currents to obtain the actual charge speed t (min) and cycle performance of the battery at different charge currents, and the results are shown in Table 5.

TABLE 5

| Expected Charge Time (min) | Charge Current I(mA) | U = 4.2 + ΔV (V) | Actual Charge Time t(min) | The number of Cycles n (circles) | Safety Test with 10 C/10 V After Cycles |
|---|---|---|---|---|---|
| 30 | 100 | 4.247 | 32.1 | 382 | Non-burning and Non-burst |
| 20 | 150 | 4.303 | 21.8 | 327 | Non-burning and Non-burst |
| 15 | 200 | 4.322 | 16.2 | 278 | Non-burning and Non-burst |
| 12 | 250 | 4.352 | 13.1 | 212 | No-burning and Non-burst |
| 10 | 300 | 4.384 | 10.9 | 163 | No-burning and Non-burst |
| 6 | 500 | 4.430 | 6.6 | 89 | 1/20 Burning |

Note:
the charge time t in the table represents that the battery is fully charged within time t; the number of cycles n represents that the battery is discharged by using a discharge strategy having a discharge current of 1 C and a discharge limit voltage of 3.0 V; and the battery capacity still takes 80% of its rated capacity after n cycles.

Based on the data in the table, for client 1, the following optimal charge strategy can be selected: charge at a constant current of 200 mA and with a limit voltage of 4.322V, and the cycle life and safety performance are ensured; for client 2, the following optimal charge strategy is selected: charge at a constant current of 300 mA and with a limit voltage of 4.384V, and the cycle life and safety performance are ensured.

The invention claimed is:

1. A method for charging a lithium ion battery comprising the steps of:
   charging the lithium ion battery only at a constant current; and
   stopping the charging of the lithium ion battery when the lithium ion battery is charged to a charge limit voltage U at the constant current, characterized in that the charge limit voltage between two poles of the lithium ion battery is set to be $U=U_0+(U_0-U_s)=2U_0-U_s$, wherein
   $U_0$ is a standard charge cutoff voltage of the lithium battery used by a low rate constant current-constant voltage charging mode;
   $U_s$ is a stabilized voltage to which an oven-circuit voltage of the lithium ion battery falls back after the voltage of the lithium ion battery is charged to $U_0$ at the constant current.

2. The method for charging the lithium ion battery according to claim 1, characterized in that the stabilized voltage $U_s$ is measured and selected prior to the lithium ion battery being charged for a first use, which comprises the steps of:
   stopping charging the lithium ion battery when the voltage of the lithium ion battery is charged at the constant current to the standard charge cutoff voltage $U_0$, and;
   a drop of the open-circuit voltage of the lithium ion battery is produced after the volt of the lithium battery is charged to $U_0$ at the constant current;
   starting a timing when the voltage of the lithium ion battery is charged to the standard charge cutoff voltage $U_0$;
   measuring the drop of the open-circuit voltage of the lithium ion battery in real time during a period of the timing to determine the stabilized voltage $U_s$ of the lithium ion battery;
   dividing the period of the timing into equal time segments, and from an equal time segment, during which the drop of the open-circuit voltage of the lithium ion battery is less than a certain value within the certain time segment, which means that the voltage of the lithium ion battery is stable, selecting a voltage corresponding to a first time point of the time segment as the stabilized voltage $U_s$ of the lithium ion battery.

3. The method for charging the lithium ion battery according to claim 1, characterized in that the stabilized voltage $U_s$ is measured and selected prior to the lithium ion battery being charged for a first use, which comprises the steps of:
   stopping charging the lithium ion battery when the voltage of the lithium ion battery is charged at the constant current to the standard charge cutoff voltage $U_0$, and a drop of the open-circuit voltage of the lithium ion battery is produced after the voltage of the lithium ion battery is charged to $U_0$ at the constant current;
   starting a timing when the voltage of the lithium ion battery is charged to the standard charge cutoff voltage $U_0$;
   measuring the drop of the open-circuit voltage of the lithium ion battery in real time during a period of the timing to determine the stabilized voltage $U_s$ of the lithium ion battery;
   dividing the period of the timing into equal time segments, each of which is of 5 minutes, and from a time segment, during which the drop of the open-circuit voltage of the lithium ion battery is less than 2 mV within the time segment of 5 minutes, which means that the voltage of the lithium ion battery is stable, selecting a voltage corresponding to a first time point of the time segment as the stabilized voltage $U_s$ of the lithium ion battery.

4. The method of charging the lithium ion battery according to claim 1, characterized in that the stabilized voltage $U_s$ is measured and selected prior to the lithium ion battery being charged for a first use, which comprises the steps of:
   stopping charging the lithium ion battery when the lithium ion battery is charged at the constant current to the standard charge cutoff voltage $U_0$, and a drop of the open-circuit voltage of the lithium ion battery will be produced after the voltage of the lithium ion battery is charged to $U_0$ at the constant current;
   starting a timing when the voltage of the lithium ion battery is charged to the standard charge cutoff voltage $U_0$;
   measuring the drop of the open-circuit voltage of the lithium ion battery in real time during a period of the timing to determine the stabilized voltage $U_s$ of the lithium ion battery;
   dividing the period of the timing into equal time segments, each equal time segment being 10 minutes and from a time segment, during which the drop of the open-circuit voltage of the lithium ion battery is less than 1 mV within the time segment of 10 minutes, which means that the voltage of the lithium ion battery is stable, selecting a voltage corresponding to a first time point of the time segment as the stabilized voltage $U_s$ of the lithium ion battery.

* * * * *